(12) United States Patent
Freed

(10) Patent No.: US 6,671,660 B2
(45) Date of Patent: Dec. 30, 2003

(54) METHODS AND APPARATUS FOR POWER CONTROL

(75) Inventor: Mason L. Freed, Walnut Creek, CA (US)

(73) Assignee: OnWafer Technologies, Inc., Pleasant Hill, CA (US)

(*) Notice: Subject to any disclaimer, the term of this patent is extended or adjusted under 35 U.S.C. 154(b) by 30 days.

(21) Appl. No.: 10/126,497

(22) Filed: Apr. 19, 2002

(65) Prior Publication Data

US 2002/0161557 A1 Oct. 31, 2002

Related U.S. Application Data

(60) Provisional application No. 60/285,613, filed on Apr. 19, 2001, and provisional application No. 60/285,439, filed on Apr. 19, 2001.

(51) Int. Cl.[7] ............................ G06F 11/00; H04Q 7/20; G08C 17/00
(52) U.S. Cl. .................... 702/188; 455/522; 370/311
(58) Field of Search .................. 702/188; 455/343.1, 455/557, 574, 458, 466, 517, 522; 340/825.72, 825.69; 370/311, 335, 337, 338, 342

(56) References Cited

U.S. PATENT DOCUMENTS

| 5,809,428 A | * | 9/1998 | Garahi et al. ............... 455/517 |
| 5,969,639 A | | 10/1999 | Lauf et al. ............. 340/870.17 |
| 6,244,121 B1 | | 6/2001 | Hunter ...................... 73/865.9 |

FOREIGN PATENT DOCUMENTS

WO    WO 02/17030 A2    2/2002

OTHER PUBLICATIONS

"Autonomous Micro–sensor Arrays for Process Control of Semiconductor Manufacturing Processes," Darin Fisher, Mason Freed, Kameshwar Poolla and C. J. Spanos—U.C. Berkeley, Presented: Proceedings of the 38th Conference on Decision and Control– Dec. 7–10, 1999. Presentation on Dec. 10, 1999.

"Micro–sensor Arrays for Calibration, Control, and Monitoring of Semiconductor Manufacturing Processes," Darin Fisher, Mason Freed, Kameshwar Poolla and C. J. Spanos—U.C. Berkeley, Presented: 1999 IEEE International Conference on Control Applications, Aug. 22–26, 1999. Presentation on Aug. 24, 1999.

U.S. patent application # 09/643,614, filed on Mar. 22, 2001.
U.S. application # 60/285,439, filed on Apr. 19, 2001.
U.S. application # 60/285,613, filed on Apr. 19, 2001.
U.S. application # 10/126,455, filed on Apr. 19, 2002.

* cited by examiner

Primary Examiner—John Barlow
Assistant Examiner—Meagan S. Walling
(74) Attorney, Agent, or Firm—Larry Williams

(57) ABSTRACT

Described are methods and apparatus that can provide increased power use efficiency for some applications of wireless telecommunications devices. An aspect of the present invention includes an apparatus for wireless communication. The apparatus includes a wireless communication system powered with a limited capacity power source. The apparatus is capable of controlling the power applied to the communication system so as to increase the efficiency for using the power. Another aspect of the present invention is a method of controlling power use for wireless telecommunications with a limited capacity power source.

19 Claims, 3 Drawing Sheets

METHODS AND APPARATUS FOR POWER CONTROL

CROSS-REFERENCE

The present application claims benefit of U.S. patent application Ser. No. 60/285,613 filed on Apr. 19, 2001 and U.S. patent application Ser. No. 60/285,439 filed on Apr. 19, 2001. The present application is related to U.S. patent application Ser. No. 60/285,613 filed on Apr. 19, 2001, U.S. patent application Ser. No. 10/126,455, Docket # AWS-026, entitled "METHODS AND APPARATUS FOR LOW POWER DELAY CONTROL," filed Apr. 19, 2002, U.S. patent application Ser. No. 60/285,439 filed on Apr. 19, 2001, U.S. patent application Ser. No. 09/643,614, filed on Aug. 22, 2000 also published as Patent Corporation Treaty application WO 02/17030, and U.S. patent application Ser. No. 09/816,648, filed on Mar. 22, 2001 now U.S Pat. No. 6,542,835; all of these applications are incorporated herein, in their entirety, by this reference.

TECHNICAL FIELD

This invention relates to improved methods and apparatus for controlling power use of a communication device, more particularly, controlling the power use of a sensor apparatus for collecting data.

BACKGROUND

The most successful processing of materials for electronic devices typically requires optimization and precise control of the processing environment at all process steps. Many of these process steps are performed under conditions that make it difficult or impossible to measure the desired process variables. In those cases where an important process variable cannot be readily measured, an attempt is made to correlate the parameter of interest to other measurable or controllable parameters. The accuracy and stability of these correlations, also called equipment response models, are a critical factor in determining the process capability and device yield at any given process step.

Descriptions of some of the available technologies and sensor apparatus for measuring process variables are available in the technical and patent literature. Examples of some of the technologies are described in United States patents U.S. Pat. Nos. 6,244,121, 6,051,443, 6,033,922, 5,989,349, 5,967,661, 5,907,820, and Patent Corporation Treaty application WO 02/17030.

Some of the available technologies are tethered systems in which sensors exposed to the process conditions that are to be measured have physical connections to remote facilities such as power sources, information processors, and electronic components. Other technologies use an electronics module that is coupled to the sensors on a support. The electronics module includes an independent power source, an information processor, and wireless communication capability. The sensors and electronics module are part of a single unit that is exposed to the process conditions that are to be measured. The electronics module enables the sensor apparatus to operate autonomously.

Wireless communication systems, such as those that use infrared and radio frequency (RF), can draw significant amounts of power from a power source. For many wireless sensor applications, it is typically desirable or necessary for the sensor apparatus to be capable of operating for a long period of time without need for recharging or replacing the power source. A typical approach to reduce the power draw of the wireless communication system is to use systems that require less power. This will mean that the output power of the communication system will be low and the range will be short. As an alternative approach, the capacity of the power source can be increased. This means that a larger power source, such as a larger battery, can be used to meet the high-power demand. In summary, both approaches require a sacrifice that may be unsuitable for some applications; either communication distance is reduced because of lower power draw or the physical size of the sensor apparatus is larger because of the necessarily larger power source.

Numerous applications require operation of a wireless communication system powered by a limited power source. There is a need for methods and apparatus that allow more efficient use of the available power for such systems. For some applications, the need further extends to methods of accomplishing efficient power use for communication systems that may need to be small in size and capable of longer-range communication. As an example application, there is a need for a sensor apparatus capable of wireless communication with efficient power use.

SUMMARY

This invention seeks to provide methods and apparatus that can provide increased power use efficiency for some applications of wireless telecommunications devices. An aspect of the present invention includes an apparatus for wireless communication. The apparatus includes a wireless communication system powered with a limited capacity power source. The apparatus is capable of controlling the power applied to the communication system so as to increase the efficiency for using the power.

Another aspect of the present invention is a method of controlling power use for wireless telecommunications with a limited capacity power source.

One embodiment of the present invention includes methods of acquiring data for generating response models and for monitoring, controlling, and optimizing processes and process tools and further includes power control capability for improved power use efficiency. The method is carried out using a sensor apparatus having an independent power source and a wireless communication system.

It is to be understood that the invention is not limited in its application to the details of construction and to the arrangements of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out aspects of the present invention. It is important, therefore, that the claims be regarded as including such equivalent constructions insofar as they do not depart from the spirit and scope of the present invention.

The above and still further features and advantages of the present invention will become apparent upon consideration of the following detailed descriptions of specific embodiments thereof, especially when taken in conjunction with the accompanying drawings.

DESCRIPTION

Figure 1:
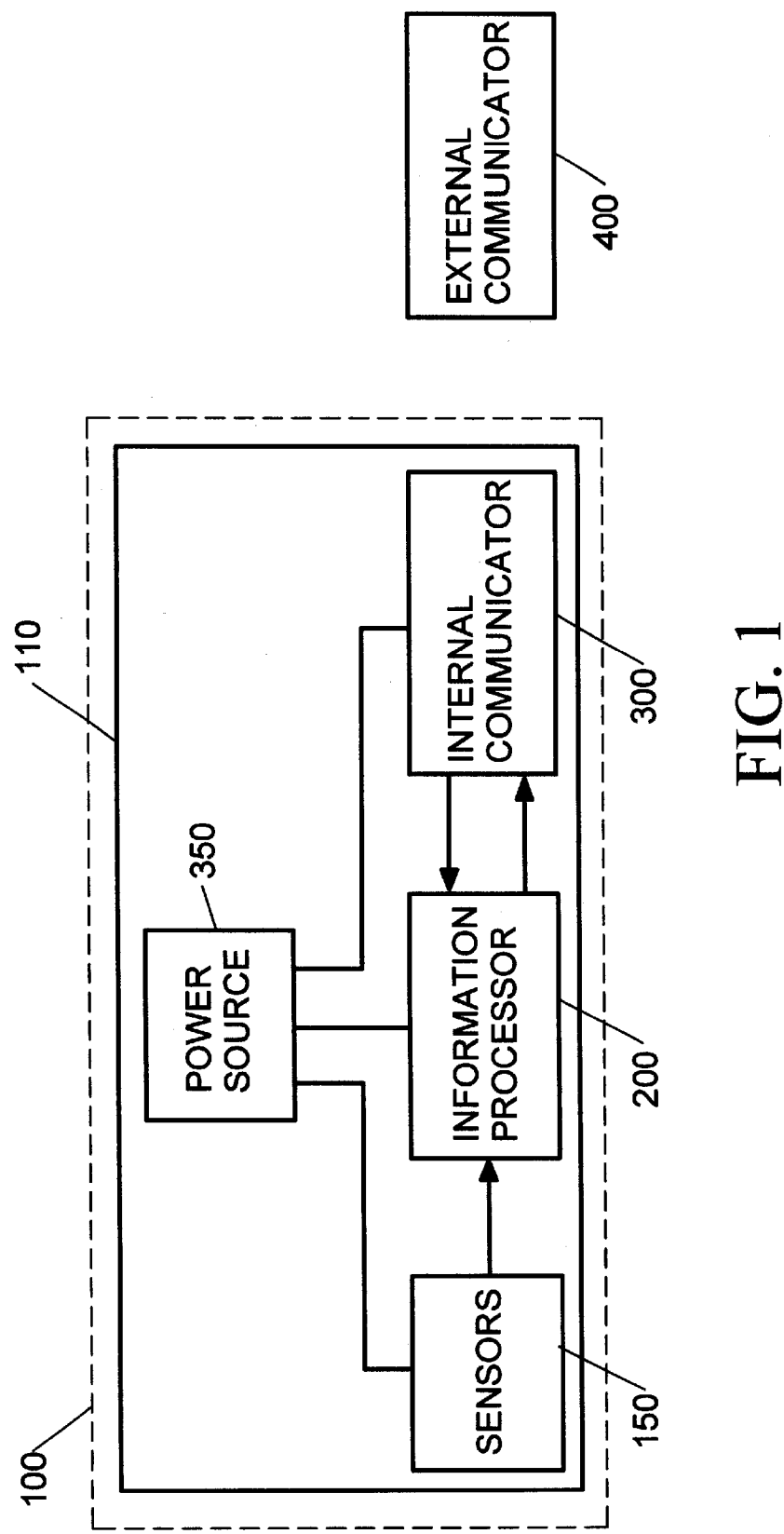
FIG. 1 is a diagram of an embodiment of the present invention shown in relation to additional communication equipment.

The operation of embodiments of the present invention will be discussed below, primarily, in the context of processing semiconductor wafers or flat panel displays. More specifically, the embodiments described are directed toward a sensor apparatus for collecting and transmitting data from within a process environment, such as a process chamber, to a location for storing the data. However, it is to be understood that embodiments in accordance with the present invention may be used for essentially any application where a device, such as a microprocessor-based device, used for sporadic activities such as information transfer must conserve power, possibly because of a limited power supply.

In the following description of the figures, identical reference numerals have been used when designating substantially identical elements or steps that are common to the figures.

Reference is now made to FIG. 1 wherein there is shown a block diagram for a sensor apparatus 100. Sensor apparatus 100 includes a substrate 110, a sensor, preferably a plurality of sensors 150, an information processor 200, an internal communicator 300, and a power source 350. Sensors 150, information processor 200, internal communicator 300, and power source 350 are supported by substrate 110. Sensors 150 are connected with information processor 200 so as to allow signals generated by sensors 150 to be provided as input to information processor 200. Information processor 200 is connected with internal communicator 300 so as to allow information and data from information processor 200 to be transferred to internal communicator 300. In preferred embodiments, information processor 200 is connected with internal communicator 300 so as to allow bi-directional information transfer between information processor 200 and internal communicator 300.

Power source 350 is connected with information processor 200 so as to provide electric power to information processor 200. Power source 350 is connected with internal communicator 300 so as to provide electric power to internal communicator 300. Embodiments of the present invention may include sensors 150 for which sensors 150 require electric power for operation; for those embodiments, power source 350 is connected with sensors 150 so as to provide electric power to sensors 150. In alternative embodiments, sensors 150 do not require electric power; consequently, connection with electric power source 350 is unnecessary for such embodiments.

Internal communicator 300 is a transmitter and receiver capable of wirelessly transmitting and receiving information and data to an external receiver and transmitter; in other words, bidirectional information transfer. For embodiments in which information processor 200 and internal communicator 300 are coupled for bi-directional information transfer, internal communicator 300 is capable of transmitting information to a receiver in addition to receiving information from a transmitter.

FIG. 1 also shows an external communicator 400 arranged for wireless bidirectional information transfer with internal communicator 300. In other words, the information is transferred wirelessly, without wires, without cables, and without need for a continuous physical connection. Wireless communication technology is well known. Two examples of suitable wireless communication techniques are techniques that use sound and techniques that use electromagnetic radiation. Substantially any type of electromagnetic radiation that is usable for communication applications may be suitable for embodiments of the present invention. Examples of suitable types of electromagnetic radiation are microwave radiation, radio frequency radiation, ultraviolet radiation, visible light radiation, and infrared radiation. One embodiment of the present invention uses pulsed infrared light with a wavelength between 850 nm and 900 nm for wireless communication.

Substrate 110 supports and serves as a carrier for sensors 150, information processor 200, internal communicator 300, and power source 350. Preferably, substrate 110 has material properties similar to those of a workpiece for which the process conditions are being measured.

Optionally, for some embodiments of the present invention for semiconductor processing applications, substrate 110 comprises a semiconductor wafer. The semiconductor wafer is provided to simulate actual processing conditions so as to present substantially appropriate physical profile, thermal mass, other key electrical properties, and key chemical properties to the processing environment. Similarly, for flatpanel display applications, substrate 110 may comprise a flatpanel display substrate.

Power source 350 is a local, onboard power source for providing electrical power needed for operation of sensor apparatus 100, particularly communicator 300. Preferably, power source 350 is sufficiently self-contained so that sensor apparatus 100 does not need to be physically connected to an outside power source while collecting data. In preferred embodiments, power source 350 includes a stored power source such as a battery. Another prospective power source is a capacitor. Other power sources for driving electronic devices are suitable for embodiments of the present invention.

As a result of having an onboard power source, sensor apparatus 100 is more capable of acquiring data for response models in a substantially nonperturbing manner. In addition, modifications to the process tool in order to make physical connections to an external power source are unnecessary. Advantageously, the absence of wires and cables makes it easier to load and unload sensor apparatus 100 using substantially the same robots as those used for loading and unloading the workpieces.

Internal communicator 300 is a communication device. There are numerous publications describing communication devices that are suitable for use as internal communicator 300. In a preferred embodiment of the present invention, the communication function is performed using readily available infrared emitting and detecting components. These components and technology are in widespread use for short-range communication applications such as appliance remote control.

Furthermore, several communications protocols exist which are suitable for use in embodiments of the present invention. For example, one embodiment of the present invention may use a modified ASCII code with Cyclic Redundancy Check (CRC) for error detection and an automatic baud rate matching method.

Information processor 200 is configured so as to be capable of controlling the operation of internal communicator 300. Control of the operation of internal communicator 300 includes controlling the amount of power used by internal communicator 300 such as by controlling the level of operation of internal communicator 300. As a specific example, information processor 200 is configured so as to be capable of shutting off power input to internal communicator 300 so that the power used by internal communicator 300 is essentially zero. Information processor 200 is also capable of turning on the power input to internal communicator 300 so as to enable the operation of internal communicator 300.

Clearly, if the power used by internal communicator 300 is shut off, then the overall power usage of sensor apparatus 100 is reduced. Advantageously for numerous applications of sensor apparatus 100, continuous communication capability is unnecessary. Consequently, disabling internal communicator 300 for a significant portion of time, during which communication capability is unnecessary, reduces the power usage of sensor apparatus 100. Information processor 200 is also configured to enable the operation of internal communicator 300 so as to allow sensor apparatus 100 to determine whether a signal is being sent to sensor apparatus 100. In other words, information processor 200 enables the operation of internal communicator 200 so that sensor apparatus 100 "listens" for an incoming communication signal that may be referred to as a "wake-up" signal. In preferred embodiments, the wake-up signal is an instruction such as instructions telling sensor apparatus 100 to start transmitting data, to start storing data, or other instructions.

External communicator 400 is configured so as to the providing the wake-up signal for internal communicator 300. Information processor 200 allows listening to occur for a period of time; this may be referred to as a listening mode. Preferably, the time for listening is predetermined and preferably is a short period of time so as to increase the overall average reduction in power usage.

If information processor 200 and internal communicator 300 receive the wake-up signal, then information processor 100 provides a predetermined response to the wake-up signal. An example of a response would be to start transmitting data. After completing the response to the wake-up signal, information processor 200 disables internal communicator 200 for an amount of time so as to reduce the power used by sensor apparatus 100. The reduced power state for sensor apparatus 100 may be referred to as a sleep mode. Information processor 200 creates the sleep mode by disabling internal communicator 300 and initiating and running a low-power delay routine for an amount of time; in other words there is a period of waiting during the sleep mode. Preferably, the time interval for the sleep mode is predetermined. Information processor 200 starts the listening mode again at the end of the sleep mode, and the cycle is repeated.

However, if the wake-up signal is not detected during the listening period, then information processor 200 disables internal communicator 300 for an amount of time so as to reduce the power used by sensor apparatus 100. In other words, information processor 200 causes sensor apparatus 100 to enter the sleep mode. Information processor 200 starts the listening mode again at the end of the sleep mode, and the cycle is repeated.

The reduction in power usage results from having sensor apparatus 100 in the sleep mode so that it uses less power for a period of time. Preferably, sensor apparatus 100 is in the sleep mode for a long period of time compared to the period of time for the listening mode and the wake mode. Sensor apparatus 100 needs only to be in the wake mode when listening for the wake-up signal or when responding to the wake-up signal. Information processor 200 is configured to allow sensor apparatus 100 to remain in the wake mode for as long as necessary for responding to the wake-up signal.

In preferred configurations, communications can be initiated by either side of a communication link at will, and very little power is expended while no data is being transferred. Preferably, the wake-up signal is sent for the entire duration of the "sleep" routine. Though this may mean that external communicator 400 is using power during part sleep mode, the power used by sensor apparatus 100 remains low during the sleep mode. For typical applications of sensor apparatus 100, external indicator 400 will typically have an easily accessible power source that does not have the limitations of power source 350. Preferred embodiments of the present invention include the capability of high bit-rate communications that can be performed relatively infrequently, with significant low-power use time between communications bursts.

Preferably, the wake-up signal is selected so that internal communicator 300 is capable of detecting the wake-up signal quickly and accurately. Because internal hundred is only enabled for a short period of time, it is advantageous to provide a wake-up signal that can be detected quickly so as to reduce the time required for internal communicator 300 to be enabled. In addition, preferred embodiments of the present invention are capable of accurately detecting the wake-up signal so as to minimize wasting power on false wake-up signals. The detection of a false wake-up signal consumes additional power because the false wake-up signal causes internal communicator 300 to be turned on unnecessarily. Furthermore, accuracy in detecting the wake-up signal is preferable because failure to detect a true wake-up signal will cause the microprocessor to go back into the sleep mode, thus, causing an unnecessary delay in communications, and causing external communicator 400 to transmit the wake-up signal for an unnecessary amount of time.

In a preferred embodiment, information processor 200 includes a central processing unit, a memory, and other capabilities for collecting data from sensors 150, processing the data received from sensors 150, storing the data from sensors 150 in the memory, sending the data to internal communicator 300, responding to commands received via internal communicator 300, and generally controlling the operation of sensor apparatus 100. There are numerous microprocessors that are suitable for use in embodiments of the present invention. Microchip Technologies, Inc. produces a number of microprocessors that are suitable for embodiments of the present invention. Alternatively, information processor 200 may include an application-specific integrated circuit for performing at least some of the control functions of the sensor apparatus.

There are numerous suitable types of electronic memory devices that may be used for embodiments of the present invention. For some embodiments of the present invention, the memory may include random access memory (RAM), read only memory (ROM), or combinations of RAM and ROM. One embodiment of the present invention includes a memory comprising an EEPROM such as those made by Microchip Technologies, Inc.

In one embodiment of the present invention, power source 350 comprises one or more small, rechargeable lithium batteries capable of providing a nominal output voltage of 3.3 volts. As an alternative to using rechargeable batteries, power source 350 may be a non-rechargeable battery. It is to be understood that the power sources other than batteries can be used for the present invention. Capacitors are one example of an alternative power source.

The capabilities of information processor 200 for controlling the power used by sensor apparatus 100 may be implemented as embedded software. Specifically, the software for operating the sensor apparatus is included with the sensor apparatus; in one embodiment, the software may be contained in the information processor. This means that the software may be arranged to be capable of operating from within the process environment that is being characterized by the sensor apparatus as well as outside of the process environment.

As is known to those skilled in the art, a variety of programming languages can be used such as assembly language, such as C, such as C++, and such as BASIC for embodiments of the present invention. Optionally, the software may be broken up into multiple files for easier readability. The software may employ subroutines for performing particular actions and commands.

Specific software commands and structures may be dependent upon the particular hardware configuration that will use the software. In the spirit of providing a general description of the software, the following description emphasizes novel features and critical features for embodiments of the present invention. Obvious hardware dependent generalities may not be described here unless necessary. In addition, details may not be given for well-known support algorithms such as error handling, device initialization, peripheral drivers, information transfer, timer control, and other general types of command execution.

Figure 2:
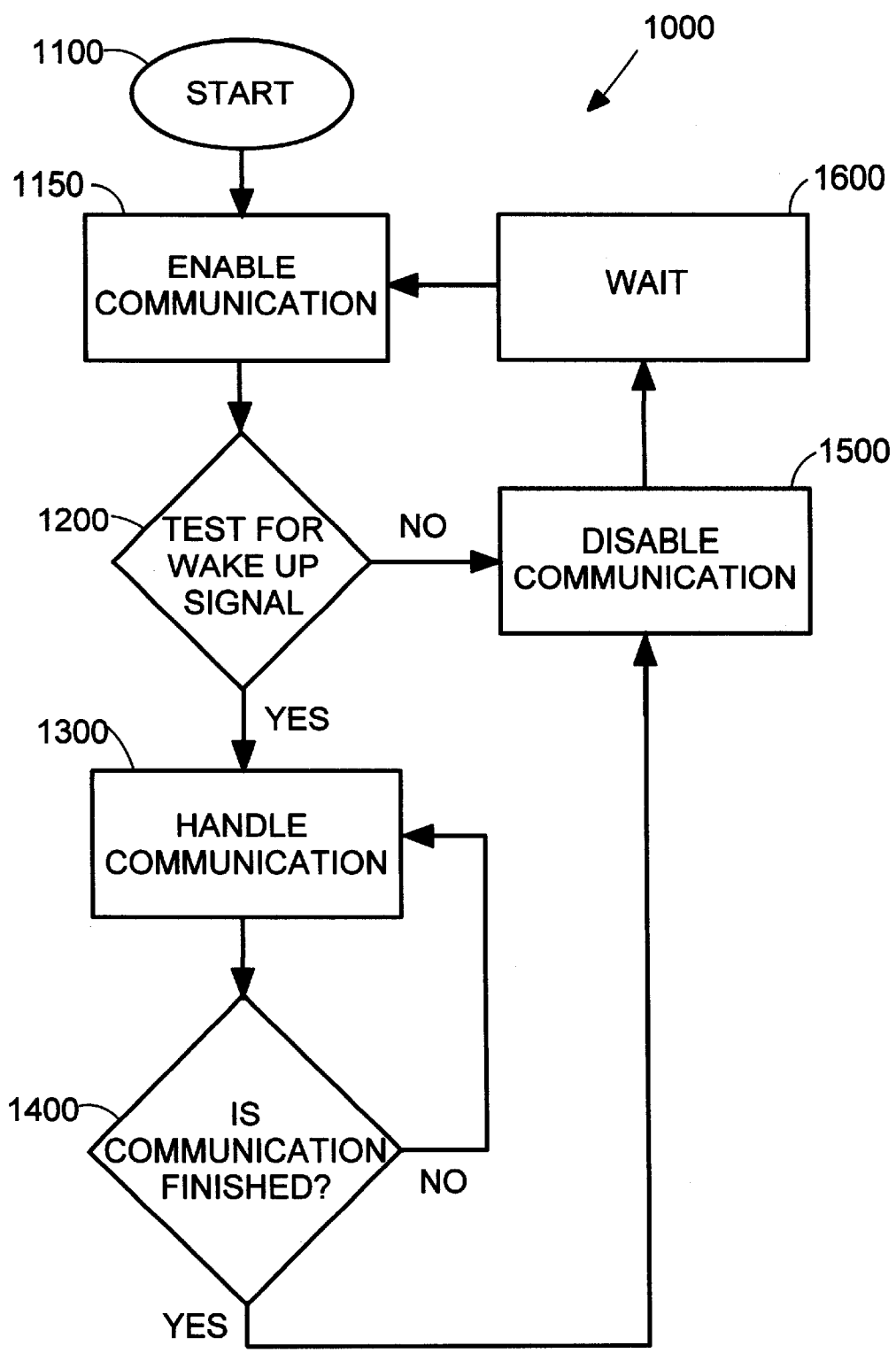
FIG. 2 is a flowchart of an embodiment of the present invention.

Reference is now made to FIG. 2 wherein there is shown a flow diagram 1000 of an embodiment of a software program for controlling the power used by a sensor apparatus or other communication device. The steps in the flowchart shown in FIG. 2 are suitable for use in a sensor apparatus such as that describe in FIG. 1. Step 1100 represents the start of the program. Step 1150 is the enable communications system step that follows step 1100. Step 1150 includes providing power for operating the internal communicator.

Step 1200 follows step 1150. Step 1200 involves testing to see if a wake-up signal is being sent. In other words, step 1200 corresponds to listening for a wake-up signal. If a wake-up signal is detected, then the next step is step 1300, a handle communications step. Handle communications step 1300 involves having the sensor apparatus, particularly the information processor in the sensor apparatus respond to the wake-up signal. For a typical sensor apparatus application, an example of a response would be to perform an action such as starting transmission of data.

Step 1400 follows step 1300. Step 1400 involves testing to determine when to end the communication. In preferred embodiments, the communication is allowed for as long as necessary to complete the response to the wake-up signal. In one embodiment, this activity is accomplished by looping back to step 1300 from step 1400 until the communication is completed. In one embodiment of the present invention, a binary flag signaling that the communications are completed is sent to the processor. Other methods of indicating the completion of the communication can be used; such methods are known to those with ordinary skill in the art.

After completion of the communication, the next step is step 1500 wherein the internal communicator is disabled, i.e., the power to the internal communicator is shut off. Step 1500 is followed by wait step 1600. Wait step 1600 corresponds to the sleep mode for which the power usage by the sensor apparatus is reduced for an amount of time. Preferably, the amount of time is predetermined. At the end of step 1600, the flowchart returns to step 1150, the enable communications step. In other words, the flowchart has completed a full cycle and has returned to begin the cycle again.

Flowchart 1000 also shows that if the wake-up signal is not detected in step 1200, then the step that follows step 1200 is step 1500, the disabled communications step. The flowchart then proceeds from step 1500 to step 1600 as described. From step 1600, the flowchart returns to step 1150.

In one embodiment of the present invention, the wake-up signal causes the sensor apparatus to transmit data from the information processor via the internal communicator to the external communicator. The transmission of data from the sensors can occur about as soon as the data becomes available so as to achieve approximately real-time data transmission. Alternatively, the data that is transmitted may include data stored in the information processor, more a specifically, the data may be stored in a memory included with the information processor. The stored data may include data generated from the sensor measurements. The download of the data may take place while the sensor apparatus is still in a process tool or after the sensor apparatus has been removed from the process tool.

The standard technology approach to reducing the power requirements for sensor apparatus is to attempt to reduce the power draw of the communications scheme or increase the capacity of the power source. Contrary to the standard technology, embodiments of the present invention do not require compromises in either the communications scheme or the capacity of the power source. Embodiments of the present invention may use an appropriate communications scheme for the particular application without compromising the effectiveness of the communications scheme for reduced power requirements. Similarly, embodiments of the present invention allow greater flexibility in selecting the size of the power source. Embodiments of the present invention are capable of providing increased power use efficiency as a result of effectively using the latency of the communications system. In other words, an increase in the receiver latency is used to reduce the power draw in some embodiments of the present invention.

There is a wide variety of wake-up signals that can be used in embodiments of the present invention. The wake-up signal can be any signal that can be detected quickly, easily, and reliably, especially in the face of typical environmental noise. For different applications and environments, the signal requirements may need to be different. One example of a wake-up signal for digital transmission schemes is a repeating dual-frequency pulse train, such as that shown in FIG. 3.

Figure 3:
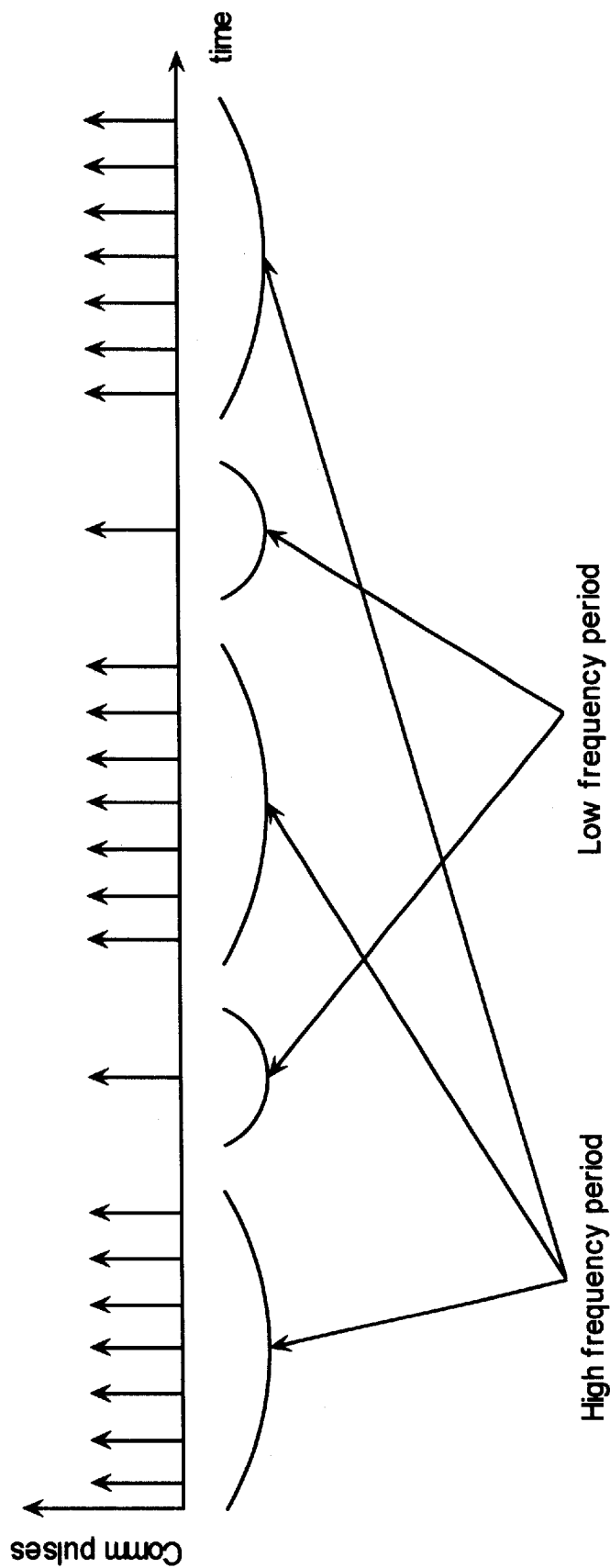
FIG. 3 is an example of a wake-up signal for an embodiment of the present invention.

Reference is now made to FIG. 3 where there is shown a signal comprising low frequency pulses and high frequency pulses. This type of signal is unlikely to be present in the environment, and therefore avoids false detection of the wake-up signal. A signal such as the one shown in FIG. 3 can be detected quickly because only a few repetitions of the signal need be detected. In other words, only a few periods of the high frequency signal and a few periods of the low frequency signal should be needed for the sensor apparatus to detect the wake-up signal. Preferably, the signal is a rapidly repeating pattern so there is no need to synchronize the internal communicator and the external communicator; the internal communicator can begin listening for the signal at any point, and complete the detection of the wake-up signal within a small amount of time. Finally, tolerances can be built into the receiver to allow the two frequencies to vary so as to reduce the probability of failing to detect the signal. For example, in environments with repeating dual-frequency noise, the example wake-up signal presented in FIG. 3 may not perform well.

Some embodiments of the present invention are capable of lower power consumption when communicating in a high-noise environment. Preferably, embodiments of the present invention are capable of using a very specific, quickly identifiable wake-up sequence to begin each communications session. As a result, the possibility that environmental noise will be misunderstood as a valid communication is reduced. Typical error detection or correction schemes require that the entire communications message be passed over the channel before a receiver can determine if the message is valid. Therefore, environmental noise might ordinarily cause a receiver to listen to the noise for an extended period of time, drawing power for the entire time, only to determine that it was not a valid message. Because environmental noise is unlikely to mimic the wake-up signal used in embodiments of the present invention, the receiver can quickly discriminate between a valid communication and noise, thereby reducing power consumption in these environments.

There are numerous applications for which embodiments of the present invention are suitable. For sporadic, infrequent, or on-demand communications situations, embodiments of the present invention are capable of extremely low power consumption during waiting periods. Embodiments of the present invention may include a high-power long-range communications methodology without the large power supplies typically required for such communications methodology. The reduced power requirements achieved as result of the teachings of the present invention means that embodiments of the present invention, such as a sensor apparatus, can be made smaller because the sensor apparatus can operate with a smaller power supply. Embodiments of the present invention also include communication devices and methods other than wireless sensors.

FIG. 2 is a flowchart and control flow illustration of methods, systems, and program products according to the invention. It will be understood that each step of the flowchart and control flow illustrations, and combinations thereof can be implemented by computer program instructions. These computer program instructions may be loaded onto a computer or other programmable apparatus to produce a machine, such that the instructions that execute on the computer or other programmable apparatus create means for implementing the functions specified in the flowchart. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart.

Accordingly, steps of the flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of steps in flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for acquiring data for process tools used for processing workpieces, the apparatus comprising:

a substrate;

at least one sensor supported by the substrate, the sensor being capable of providing information;

an information processor supported by the substrate, the information processor being connected with the sensor so as to receive information from the sensor;

an internal communicator supported by the substrate, the internal communicator being connected with the information processor so that the information processor can provide information to the internal communicator, the internal communicator being capable of wireless bi-directional communication;

a power source supported by the substrate, the power source being connected so as to provide power to the internal communicator, and the information processor being capable of shutting off power to the internal communicator for an amount of time, the information processor being capable of turning on power to the internal communicator for an amount of time so that the apparatus can test for an incoming communication signal, and the information processor being capable of allowing power to the information processor in response to a signal.

2. The apparatus of claim 1 wherein the substrate comprises at least one of a semiconductor wafer and a substrate for a flatpanel display.

3. The apparatus of claim 1 wherein the power source comprises a battery.

4. The apparatus of claim 1 wherein the information processor comprises at least one of a computer, a microprocessor, and an application-specific integrated circuit.

5. The apparatus of claim 1 wherein the internal communicator is capable of transmitting and receiving information using at least one of infrared radiation, microwave radiation, and radio frequency radiation.

6. A method of deriving operating characteristics for a process tool used for processing workpieces, the method being performed with a sensor apparatus having, at least one sensor, an information processor, an independent power supply, and a wireless bi-directional communication system, the method comprising the steps of:

a) loading the sensor apparatus into the process tool;

b) using the information processor to turn on the power to the communication system for a first predetermined amount of time so that the communication system can test for an external communication signal;

c) if there is no signal, using the information processor to turn off the power to the communication system and waiting a second predetermined amount of time with the power to the communication system turned off and returning to step b;

d) if there is a signal, measuring the operating characteristics with the sensor, converting the measured operating characteristics into digital data, performing at least one step of
  i. storing the digital data in the sensor apparatus,
  ii. transmitting the digital data to a receiver, and
  iii. storing the digital data in the sensor apparatus and transmitting the digital data to a receiver; and e) using the information processor to turn off the power to the communication system and waiting the second predetermined amount of time with the power to the communication system turned off and returning to step b.

7. The method of claim 6 wherein the first predetermined amount of time is less than the second predetermined amount of time.

8. The method of claim 6 wherein the power used by sensor apparatus is less during the second predetermined amount of time than the power used by the sensor apparatus during the first predetermined amount of time.

9. An apparatus for wireless communication, the apparatus comprising:

an information processor;

an internal communicator, the internal communicator being capable of wirelessly transmitting and receiving information, the internal communicator being connected with the information processor so that the information processor can provide information to the internal communicator;

a power source, the power source being connected so as to provide power to the internal communicator, and the information processor being capable of shutting off power to the internal communicator for an amount of time, the information processor being capable of turning on power to the internal communicator for an amount of time so that the apparatus can test for an incoming communication signal, and the information processor being capable of allowing power to the information processor in response to a signal.

10. The apparatus of claim 9 wherein the information processor comprises at least one of a computer, a microprocessor, and an application-specific integrated circuit.

11. The apparatus of claim 9 wherein the information processor comprises a microprocessor.

12. The apparatus of claim 9 wherein the information processor includes embedded executable instructions for shutting off power to the internal communicator for an amount of time, turning on power to the internal communicator for an amount of time, and allowing power to the information processor in response to a signal.

13. The apparatus of claim 9 wherein the internal communicator is capable of transmitting and receiving information using the infrared spectrum.

14. The apparatus of claim 9 wherein the internal communicator is capable of transmitting and receiving information using at least one of infrared radiation, microwave radiation, and radio frequency radiation.

15. The apparatus of claim 9 wherein the power source comprises a battery.

16. The apparatus of claim 9 wherein the internal communicator is capable of transmitting and receiving information using energy from the electromagnetic spectrum.

17. A method of operating a wireless communication device, the device having an information processor, an independent power supply, and a wireless bi-directional communication system, the method comprising the steps of:

a) using the information processor to turn on the power to the communication system for a first predetermined amount of time so that the communication system can test for an external communication signal;

b) if there is no signal, using the information processor to turn off the power to the communication system and waiting a second predetermined amount of time with the power to the communication system turned off and returning to step a;

c) if there is a signal, providing power to the communication system until a response to the signal is completed; and d) using the information processor to turn off the power to the communication system and waiting the second predetermined amount of time with the power to the communication system turned off and returning to step a.

18. The method of claim 17 wherein the first predetermined amount of time is less than the second predetermined amount of time.

19. The method of claim 17 wherein the power used by the device is less during the second predetermined amount of time than the power used by the device during the first predetermined amount of time.

* * * * *